(12) United States Patent
Scibor et al.

(10) Patent No.: US 11,714,594 B2
(45) Date of Patent: Aug. 1, 2023

(54) CUEPOINT DETERMINATION SYSTEM

(71) Applicant: SPOTIFY AB, Stockholm (SE)

(72) Inventors: Michael Scibor, Brooklyn, NY (US); Thor Kell, Brooklyn, NY (US); Rachel Malia Bittner, Brooklyn, NY (US); Tristan Jehan, Brooklyn, NY (US)

(73) Assignee: Spotify AB, Stockholm (SE)

( * ) Notice: Subject to any disclaimer, the term of this patent is extended or adjusted under 35 U.S.C. 154(b) by 342 days.

(21) Appl. No.: 16/595,404

(22) Filed: Oct. 7, 2019

(65) Prior Publication Data

US 2021/0103422 A1 Apr. 8, 2021

(51) Int. Cl.
*G06F 3/16* (2006.01)
*G06F 16/683* (2019.01)
*G06N 3/048* (2023.01)

(52) U.S. Cl.
CPC ............ *G06F 3/165* (2013.01); *G06F 16/683* (2019.01); *G06N 3/048* (2023.01); *G10H 2210/031* (2013.01); *G10H 2210/061* (2013.01); *G10H 2210/091* (2013.01)

(58) Field of Classification Search
CPC ....... G10H 2210/031; G10H 2210/061; G10H 2210/076; G10H 2210/091; G10H 2250/311
See application file for complete search history.

(56) References Cited

U.S. PATENT DOCUMENTS

| 10,068,557 | B1 | 9/2018 | Engel et al. |
| 2015/0286717 | A1 | 10/2015 | Woods |
| 2017/0140260 | A1 | 5/2017 | Manning et al. |
| 2017/0371961 | A1 | 12/2017 | Douglas |
| 2019/0035431 | A1* | 1/2019 | Attorre ................... G10L 17/00 |
| 2020/0074982 | A1* | 3/2020 | McCallum ............ G10L 15/063 |

FOREIGN PATENT DOCUMENTS

WO 2019/023256 A1 1/2019

OTHER PUBLICATIONS

Bittner et al.: "Automatic Playlist Sequencing and Transitions", Spotify Inc., 17th International Society for Music Information Retrieval Conference (2016).
(Continued)

*Primary Examiner* — Thomas H Maung
(74) *Attorney, Agent, or Firm* — Merchant & Gould P.C.

(57) ABSTRACT

A cuepoint determination system utilizes a convolutional neural network (CNN) to determine cuepoint placements within media content items to facilitate smooth transitions between them. For example, audio content from a media content item is normalized to a plurality of beats, the beats are partitioned into temporal sections, and acoustic feature groups are extracted from each beat in one or more of the temporal sections. The acoustic feature groups include at least downbeat confidence, position in bar, peak loudness, timbre and pitch. The extracted acoustic feature groups for each beat are provided as input to the CNN on a per temporal section basis to predict whether a beat immediately following the temporal section within the media content item is a candidate for cuepoint placement. A cuepoint placement is then determined from among the candidate cuepoint placements predicted by the CNN.

18 Claims, 13 Drawing Sheets

(56) References Cited

OTHER PUBLICATIONS

Len Vande Veire and Tijl De Bie: "From raw audio to a seamless mix: creating an automated DJ system for Drum and Bass", EURASIP Journal on Audio, Speech, and Music Processing, 2018:13 (2018).
"DJ-tech firm Serato launches Pyro automaticmixes app", music:)ally, Feb. 12, 2016 Available at: https://musically.com/2016/02/12/dj-tech-firm-serato-launches-pyro-automatic-mixes-app/.
"Serato Pyro—Technology behind the app", Serato, YouTube, Feb. 10, 2016. Available at: https://www.youtube.com/watch?v=8EyUx41M3tM&feature=youtu.be.
"Convolutional neural network", Wikipedia, Oct. 5, 2019. Available at: https://en.wikipedia.org/w/index.php?title=Convolutional_neural_network&oldid=919772878.

* cited by examiner

CUEPOINT DETERMINATION SYSTEM

BACKGROUND

Modern listeners typically prefer the ability to smoothly transition between songs rather than to play each song from start-to-finish. The transition is often a crossfade between two songs that happens over the course of several bars, where a currently played song fades out and a next song fades in. The point in each song when the crossfade ends is a cuepoint. For example, the point where the currently played song should be faded out is an end cuepoint of the currently played song, and a point where a next song should be faded in is a start cuepoint of the next song. Accordingly, identification of these cuepoints is essential to achieve a smooth transition.

Traditionally, humans who have expert knowledge in music (e.g., professional DJs) have manually created these transitions. However, as music streaming services have become increasingly popular and an amount of available audio content for streaming continues to grow, automatic song transitions are becoming more prevalent. Current music software solutions either do not automate transitions or lack accuracy in cuepoint identification. Additionally, current solutions are limited to scenarios where both songs involved in the transition are known. For example, a transition is specifically created for a first known song and a second known song.

SUMMARY

In general terms, this disclosure is directed to a cuepoint determination system. In one possible configuration and by non-limiting example, transitions between successively played media content items are automated by determining cuepoint placements in each of the media content items. In some configurations, a convolutional neural network (CNN) is implemented to predict candidate cuepoint placements to facilitate the determination. Various aspects are described in this disclosure, which include, but are not limited to, the following aspects.

One aspect is a method for placing a cuepoint in a media content item, the method comprising receiving at least a portion of audio content of the media content item; normalizing the received audio content into a plurality of beats; partitioning the plurality of beats into temporal sections; for one or more of the temporal sections, extracting one or more acoustic feature groups for each beat within the temporal section; providing the extracted acoustic feature groups as input to a CNN to determine candidate cuepoint placements; and determining a cuepoint placement in the media content item from among the candidate cuepoint placements received as output from the CNN.

Another aspect is a system for placing a cuepoint in a media content item, the system comprising a CNN; and a server communicatively coupled to the CNN, the server comprising at least one processing device and a memory coupled to the at least one processing device and storing instructions, that when executed by the at least one processing device, cause the at least one processing device to receive at least a portion of audio content of the media content item; normalize the received audio content into a plurality of beats; partition the plurality of beats into temporal sections; for one or more of the temporal sections, extract one or more acoustic feature groups for each beat within the temporal section; provide the extracted acoustic feature groups as input to the CNN to determine candidate cuepoint placements; and determine a cuepoint placement in the media content item from among the candidate cuepoint placements received as output from the CNN.

DETAILED DESCRIPTION

Figure 1:
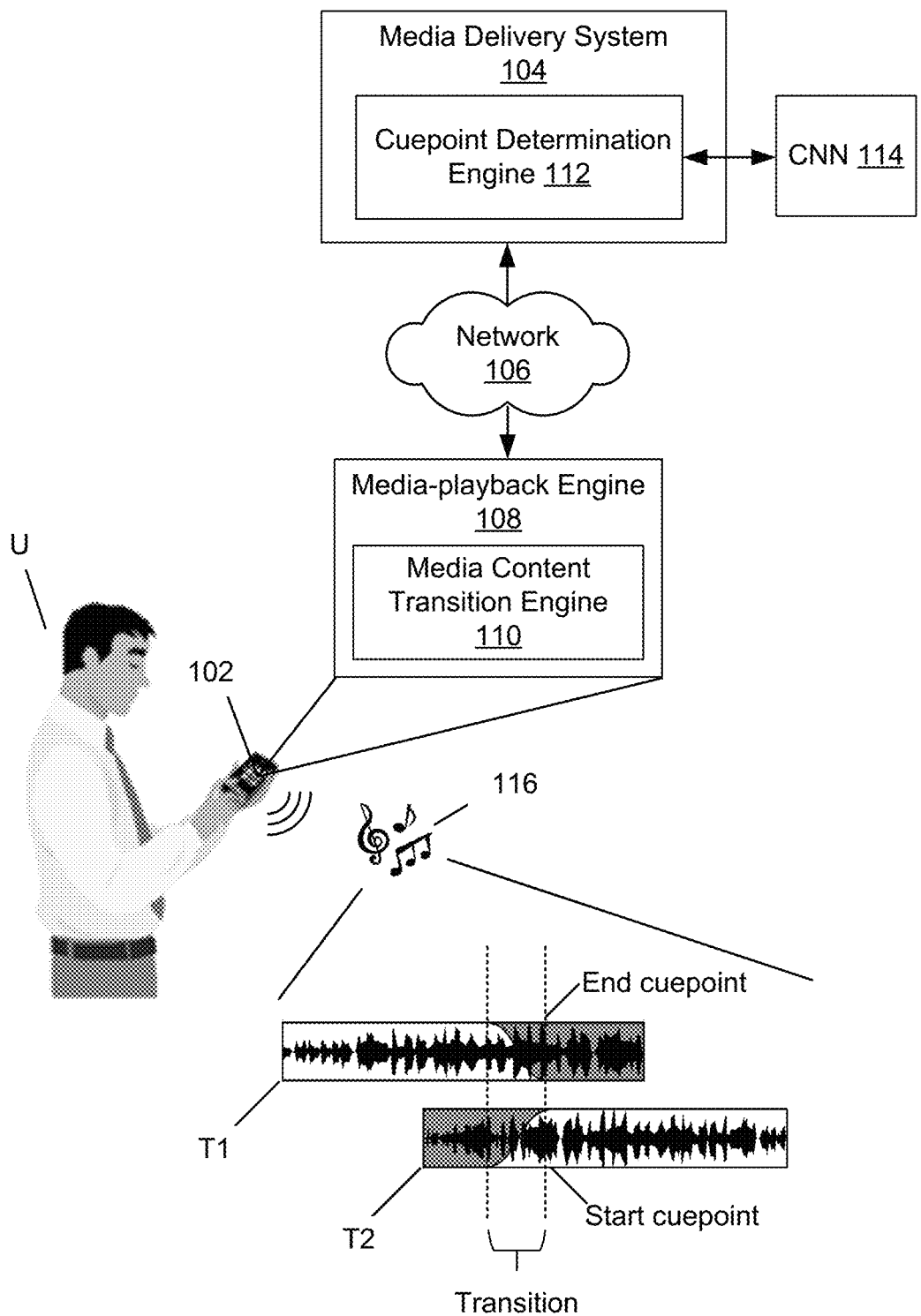
FIG. 1 illustrates an example cuepoint determination system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example cuepoint determination system 100. In this example, the system 100 includes a media playback device 102 and a media delivery system 104. The system 100 communicates across a network 106. In some embodiments, a media-playback engine 108 that includes a media content transition engine 110 runs on the media playback device 102, and a cuepoint determination engine 112 runs on the media delivery system 104. In some embodiments, a convolutional neural network (CNN) 114 is run on the media delivery system 104. In other embodiments, the CNN 114 is an independent system that communicates with the media delivery system 104 across the network 106.

Also shown is a user U who uses the media playback device 102 to continuously play back a plurality of media content items. In some examples, the media content items may be in a form of a playlist, including at least a first media content item T1 and a second media content item T2. The media content items within the playlist may be played back in a shuffled or random order. For example, first media content item T1 and the second media content item T2 may be played sequentially, or the first media content item T1 may be separated by one or more other media content items when played back.

The media playback device 102 operates to play media content items to produce media output 116. In some embodiments, the media content items are provided by the media delivery system 104 and transmitted to the media playback device 102 using the network 106. A media content item is an item of media content, including audio, video, or other types of media content, which are stored in any format suitable for storing media content. Non-limiting examples of media content items include songs, albums, music videos, movies, television episodes, podcasts, other types of audio or video content, and portions or combinations thereof. In this document, the media content items can also be referred to as tracks.

The media-playback engine 108 operates to facilitate the playing of media content items on the media playback device 102, and the media content transition engine 110 operates to create transitions between the media content items which are played sequentially by the media-playback engine 108. For example, where the first media content item T1 and the second media content item T2 are played sequentially, the media content transition engine 110 is configured to overlap at least a portion of the first media content item T1 and at least a portion of the second media content item T2 to create a transition.

In some embodiments, the transition is a crossfade between the first media content item T1 and the second media content item T2 that happens over the course of several bars. A point in the first media content item T1 where the crossfade will end and the first media content item T1 will no longer be heard is an end cuepoint. A point in the second media content item T2 where the crossfade will end and the second media content item T2 will be heard at full volume is a start cuepoint. In other words, the cuepoints are placed at a point that triggers an end of the transition. In other embodiments, a cuepoint can be placed at other locations. As one example, a cuepoint can be placed at a point that triggers a beginning of the transition. Accurate determination and placement of the start and end cuepoints is critical for ensuring the transition is smooth between the first media content item T1 and the second media content item T2.

The media delivery system 104 operates to provide the media content items to the media playback device 102. In some embodiments, the media delivery system 104 is connectable to a plurality of media playback devices 102 and provides the media content items to the media playback devices 102 independently or simultaneously. Additionally, the media delivery system 104 operates to provide cuepoint placements for the media content items to the media playback device 102. In some embodiments, the cuepoint placements are transmitted to the media playback device 102 separate from the respective media content items, and the media content transition engine 110 may place or label the cuepoints in the respective media items according to the determined placements. In other embodiments, the media delivery system 104 may have already placed or labeled the cuepoints in the respective media content items prior to providing the media content items to the media playback device 102. As referred to herein, placement of the cuepoints and labeling of the cuepoints are synonymous operations.

The cuepoint determination engine 112 operates in conjunction with the CNN 114 to determine the cuepoint placements within the media content items, such as the end cuepoint in first media content item T1 and the start cuepoint in the second media content item T2. In an example embodiment, the cuepoint determination engine 112 receives at least a portion of audio content of a media content item in a raw audio format, normalizes the received audio content into a plurality of beats, and partitions the plurality of beats into temporal sections. The normalization and partitioning render the audio content into a format that is more easily consumable by the CNN 114.

The cuepoint determination engine 112 then extracts and provides one or more acoustic feature groups for each beat within a temporal section as input to the CNN 114. The acoustic feature groups include at least downbeat confidence, position in bar, peak loudness, timbre, and pitch. The CNN 114 provides as output a prediction of whether a beat immediately following the temporal section is a candidate cuepoint placement. This can be repeated for one or more of the temporal sections of the media content item. The cuepoint determination engine 112 may then determine the cuepoint placement from among the candidate cuepoint placements.

The determination of cuepoint placement, whether it be a start cuepoint or an end cuepoint for the media content item, is based on extracted acoustic features of the media content item itself (e.g., is determined independently from other media content items). Thus, a previous media content item being played or a next media content item to be played does not need to be known, and the system 100 can places the cuepoints successfully in an environment where media content items are randomly being played and/or selected.

Figure 2:
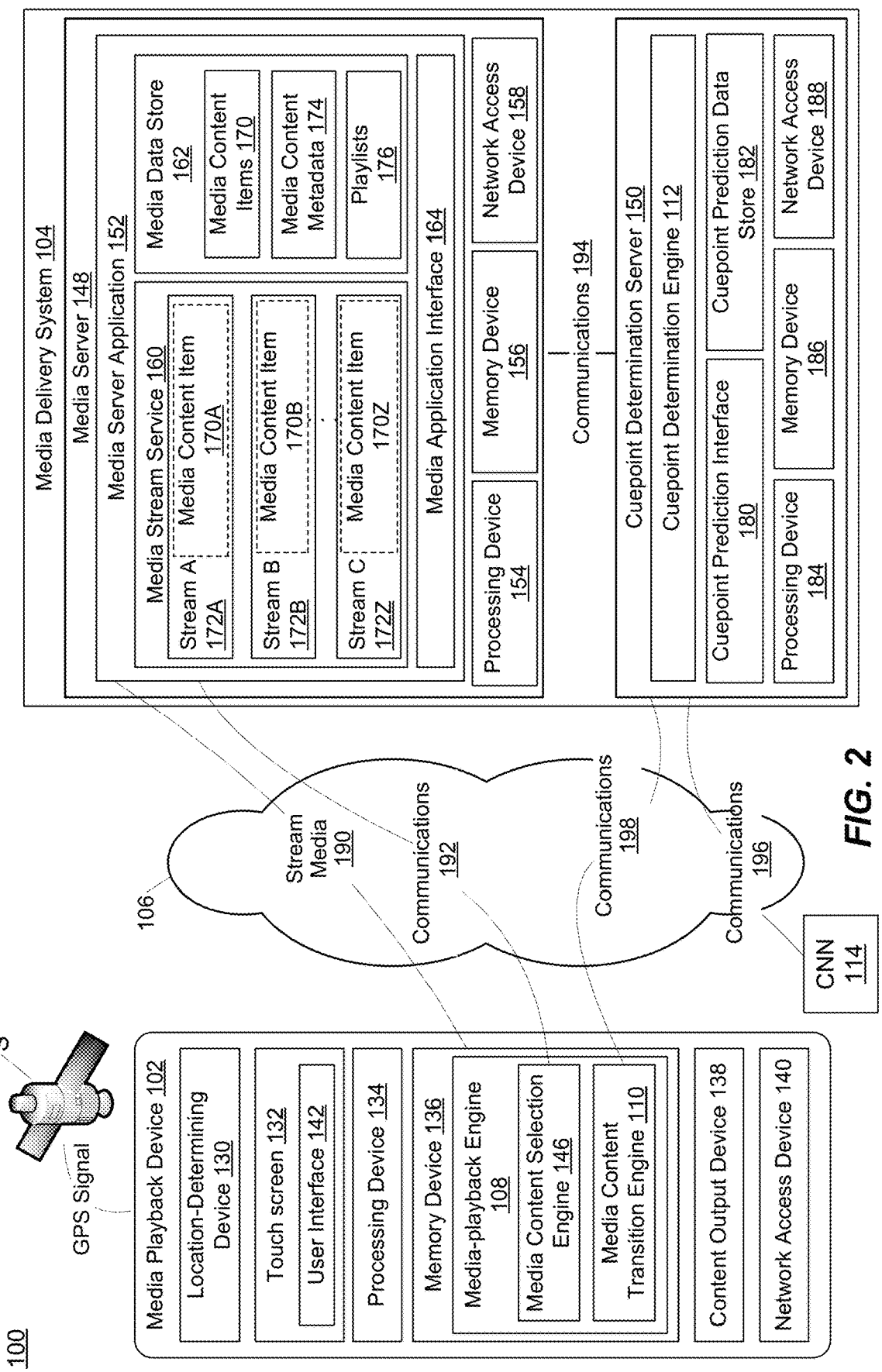
FIG. 2 illustrates an example system for playing media content items with an automated transition between media content items facilitated by cuepoint determination.

FIG. 2 illustrates an example system for playing media content items with an automated transition between media content items facilitated by cuepoint determination. As described herein, the media playback device 102 operates to play media content items. In some embodiments, the media playback device 102 operates to play media content items that are provided (e.g., streamed, transmitted, etc.) by a system external to the media playback device such as the media delivery system 104, another system, or a peer device. Alternatively, in some embodiments, the media playback device 102 operates to play media content items stored locally on the media playback device 102. Further, in at least some embodiments, the media playback device 102 operates to play media content items that are stored locally as well as media content items provided by other systems.

In some embodiments, the media playback device 102 is a computing device, handheld entertainment device, smartphone, tablet, watch, wearable device, or any other type of device capable of playing media content. In yet other embodiments, the media playback device 102 is a laptop computer, desktop computer, television, gaming console, set-top box, network appliance, blue-ray or DVD player, media player, stereo, or radio.

In at least some embodiments, the media playback device 102 includes a location-determining device 130, a touch screen 132, a processing device 134, a memory device 136, a content output device 138, and a network access device 140. Other embodiments may include additional, different, or fewer components. For example, some embodiments may include a recording device such as a microphone or camera that operates to record audio or video content. As another example, some embodiments do not include one or more of the location-determining device 130 and the touch screen 132.

The location-determining device 130 is a device that determines the location of the media playback device 102. In some embodiments, the location-determining device 130 uses one or more of the following technologies: Global Positioning System (GPS) technology which may receive GPS signals from satellites S, cellular triangulation technology, network-based location identification technology, Wi-Fi positioning systems technology, and combinations thereof.

The touch screen 132 operates to receive an input from a selector (e.g., a finger, stylus etc.) controlled by the user U. In some embodiments, the touch screen 132 operates as both a display device and a user input device. In some embodiments, the touch screen 132 detects inputs based on one or both of touches and near-touches. In some embodiments, the touch screen 132 displays a user interface 142 for interacting with the media playback device 102. As noted above, some embodiments do not include a touch screen 132. Some embodiments include a display device and one or more separate user interface devices. Further, some embodiments do not include a display device.

In some embodiments, the processing device 134 comprises one or more central processing units (CPU). In other embodiments, the processing device 134 additionally or alternatively includes one or more digital signal processors, field-programmable gate arrays, or other electronic circuits.

The memory device 136 operates to store data and instructions. In some embodiments, the memory device 136 stores instructions for a media-playback engine 108 that includes a media content selection engine 146 and the media content transition engine 110.

The memory device 136 typically includes at least some form of computer-readable media. Computer readable media include any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 138 operates to output media content. In some embodiments, the content output device 138 generates media output 116 (FIG. 1) for the user U. Examples of the content output device 138 include a speaker, an audio output jack, a Bluetooth transmitter, a display panel, and a video output jack. Other embodiments are possible as well. For example, the content output device 138 may transmit a signal through the audio output jack or Bluetooth transmitter that can be used to reproduce an audio signal by a connected or paired device such as headphones or a speaker.

The network access device 140 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media-playback engine 108 operates to play back one or more of the media content items (e.g., music) to the user U. As described herein, the media-playback engine 108 is configured to communicate with the media delivery system 104 to receive one or more media content items (e.g., through the stream media 190), as well as transition data including cuepoints determined by the media delivery system 104 for aligning and overlapping media content items when played (e.g., through communications 198).

The media content selection engine 146 operates to retrieve one or more media content items. In some embodiments, the media content selection engine 146 is configured to send a request to the media delivery system 104 for media content items and receive information about such media content items for playback. In some embodiments, media content items can be stored in the media delivery system 104. In other embodiments, media content items can be stored locally in the media playback device 102. In yet other embodiments, some media content items can be stored locally in the media playback device 102 and other media content items can be stored in the media delivery system 104.

The media content transition engine 110 is included in the media-playback engine 108 in some embodiments. The media content transition engine 110 operates to make a smooth changeover between media content items, thereby creating an enhanced level of transitioning quality across media content items which would otherwise be manually performed by music professionals, such as disc jockeys. The smooth changeover is facilitated by cuepoint placement determinations provided by the cuepoint determination engine 112. The media content transition engine 110 utilizes the determinations to place an end cuepoint at a given beat in the media content item currently being played by the media-playback engine 108 and a start cuepoint at a given beat in a next content item to be played to transition from one to the other. Alternatively, the determined cuepoints are placed or labeled at the respective beats of the media content items at the media delivery system 104 prior to the delivery of the media contents items to media-playback engine 108 through the stream media 190.

With still reference to FIG. 2, the media delivery system 104 includes one or more computing devices and operates to provide media content items to the media playback device 102 and, in some embodiments, other media playback devices as well. In some embodiments, the media delivery system 104 operates to transmit the stream media 190 to media playback devices such as the media playback device 102.

In some embodiments, the media delivery system 104 includes a media server 148 and a cuepoint determination server 150. In this example, the media server 148 includes a media server application 152, a processing device 154, a memory device 156, and a network access device 158. The processing device 154, memory device 156, and network access device 158 may be similar to the processing device 134, memory device 136, and network access device 140 respectively, which have each been previously described.

In some embodiments, the media server application 152 operates to stream music or other audio, video, or other forms of media content. The media server application 152 includes a media stream service 160, a media data store 162, and a media application interface 164.

The media stream service 160 operates to buffer media content such as media content items 170 (including 170A, 170B, and 170Z) for streaming to one or more streams 172A, 172B, and 172Z.

The media application interface 164 can receive requests or other communication from media playback devices or other systems, to retrieve media content items from the media delivery system 104. For example, in FIG. 2, the media application interface 164 receives communications 192 from the media playback device 102.

In some embodiments, the media data store 162 stores media content items 170, media content metadata 174, and playlists 176. The media data store 162 may comprise one or more databases and file systems. Other embodiments are possible as well. As noted above, the media content items 170 may be audio, video, or any other type of media content, which may be stored in any format for storing media content.

The media content metadata 174 operates to provide various pieces of information associated with the media content items 170. In some embodiments, the media content metadata 174 includes one or more of title, artist name, album name, length, genre, mood, era, etc. In addition, the media content metadata 174 includes acoustic metadata which may be derived from analysis of the track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. The media content metadata 174 can also include information associated with the cuepoint determinations for the media content items. For example, the media content metadata 174 can include a start cuepoint and an end cuepoint determined for one or more of the media content items 170.

The playlists 176 operate to identify one or more of the media content items 170. In some embodiments, the playlists 176 identify a group of the media content items 170 in a particular order. In other embodiments, the playlists 176 merely identify a group of the media content items 170 without specifying a particular order. Some, but not necessarily all, of the media content items 170 included in a particular one of the playlists 176 are associated with a common characteristic such as a common genre, mood, or era.

In this example, the cuepoint determination server 150 includes the cuepoint determination engine 112, a cuepoint prediction interface 180, a cuepoint prediction data store 182, a processing device 184, a memory device 186, and a network access device 188. The processing device 154, memory device 156, and network access device 158 may be similar to the processing device 134, memory device 136, and network access device 140 respectively, which have each been previously described.

The cuepoint determination engine 112 operates to determine cuepoint placements in media content items to facilitate a smooth transition between the media content items. In some embodiments, a CNN 114 is implemented to predict candidate cuepoint placements from which the determined cuepoint placement is selected. The CNN 114 can be a component of the cuepoint determination engine 112 or a separate component communicatively coupled to the cuepoint determination engine 112. For example, CNN 114 provides the cuepoint determination engine 112 with predicted candidate cuepoint placements, and the cuepoint determination engine 112 determines a placement for the cuepoint from among the predicted candidate cuepoint placements. The cuepoint placements can be communicated to the media content transition engine 110 (e.g., through the communications 198) for automatic placement of the cuepoints within the media content items, where the media content items are separately provided to media content selection engine 146 through the stream media 190. Alternatively, cuepoint placements can be provided to media server application 152 through communications 194 and automatically placed within the media content items prior to providing the media content items to the media-playback engine 108 through stream media 190.

The cuepoint prediction interface 180 can receive requests or other communication from other systems. For example, the cuepoint prediction interface 180 receives communications 194 from the media server application 152, the communications including audio content associated with the media content items involved in a transition. Additionally, the cuepoint prediction interface 180 receives communications 196 from the CNN 114, the communications including candidate cuepoint placements. In some examples, the cuepoint prediction interface 180 facilitates transmission of the communications 198 to media playback devices (e.g., to media content transition engine 110 of media playback device 102), the communications including respective cuepoint placements for media content items.

In some embodiments, the cuepoint prediction data store 182 stores the candidate cuepoint placements as well as the determined cuepoint placement for the media content items. The cuepoint prediction data store 182 may comprise one or more databases and file systems. Other embodiments are possible as well. In some examples, the determined cuepoint placement for the media content items are provided to media server application 152 (e.g., through the communications 194) for storage in media data store 162 as part of the media content metadata 174.

Referring still to FIG. 2, the network 106 is an electronic communication network that facilitates communication between the media playback device 102 and the media delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Although FIG. 2 illustrates only a single media playback device 102 communicable with a single media delivery system 104, in accordance with some embodiments, the media delivery system 104 can support the simultaneous use of multiple media playback devices, and the media playback device can simultaneously access media content from multiple media delivery systems. Additionally, although FIG. 2 illustrates a streaming media based system for managing transitions between media content items, other embodiments are possible as well. For example, in some embodiments, the media playback device 102 includes a media data store 162 and the media playback device 102 is configured to perform management of transitions between media content items without accessing the media delivery system 104. Further in some embodiments, the media playback device 102 operates to store previously streamed media content items in a local media data store.

Figure 3:
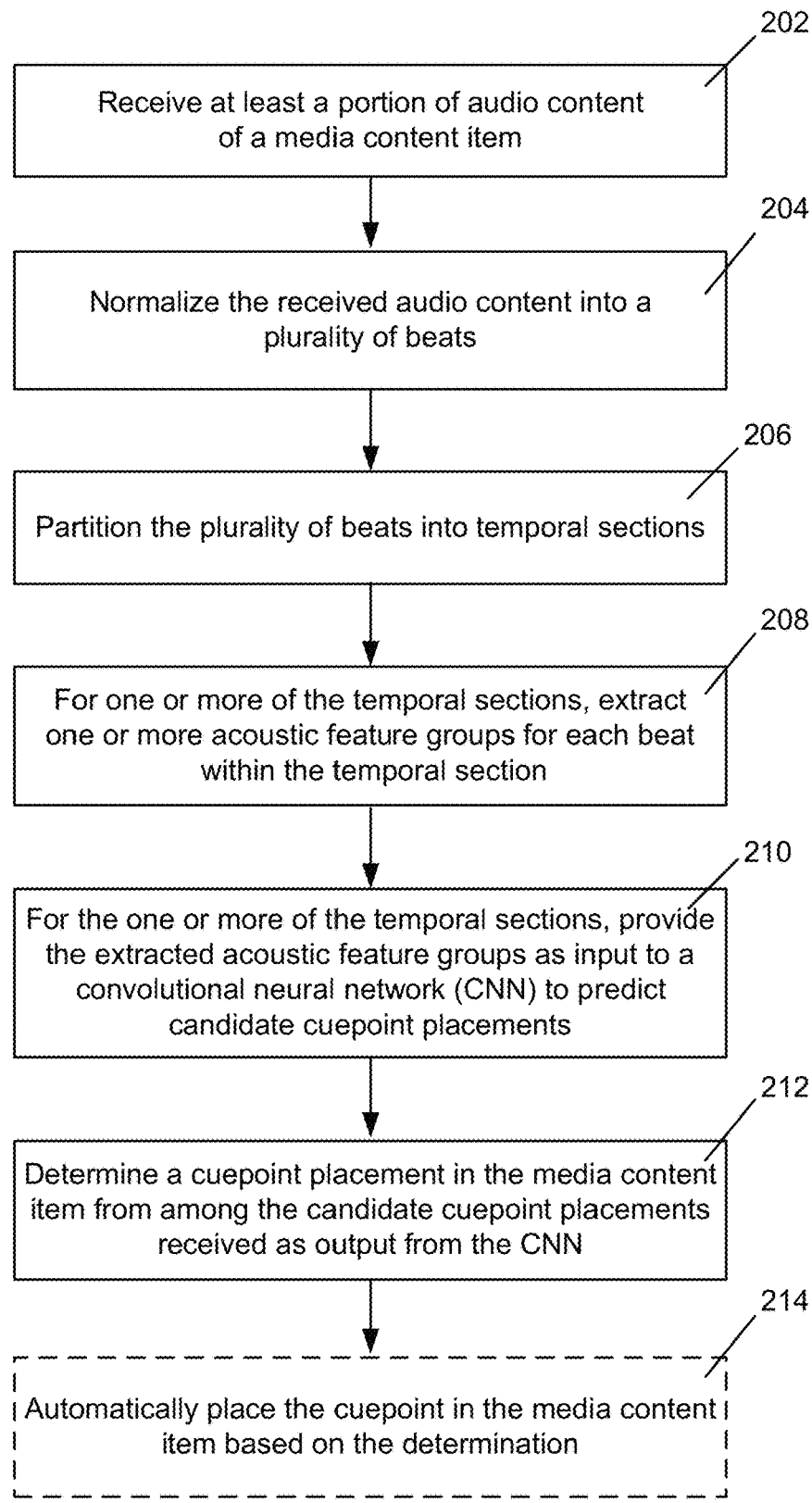
FIG. 3 illustrates an example method for cuepoint determination in a media content item.

FIG. 3 illustrates an example method 200 for cuepoint determination in a media content item. In this example, the method 200 is described as being performed by the cuepoint determination engine 112 as described in FIG. 1 and FIG. 2.

The method can begin at operation 202, where at least a portion of audio content of the media content item is received. In some embodiments, the audio content is received in a raw audio format. However, audio content in raw audio format is a file format that is large and cumbersome to process. Therefore, at operation 204 the received audio content is normalized into a plurality of beats, described in greater detail with respect to FIG. 9.

At operation 206, the plurality of beats are partitioned into temporal sections. The temporal sections can be windows of length W, where W=N beats. In some embodiments, n is dependent on a time in which the media content is written. For example, for a media content item in 4/4 time, the temporal sections are comprised of five beats to capture one previous measure plus the current beat. Additionally, the temporal sections can be sliding windows. As one example, a first temporal section is comprised of beats 1, 2, 3, 4, and 5, a second temporal section is comprised of beats 2, 3, 4, 5, and 6, and so on, as described in greater detail with respect to FIG. 10.

At operation 208, for one or more of the temporal sections, one or more acoustic feature groups are extracted for each beat within the temporal section. The acoustic feature groups include pitch, timbre, loudness, and beat-related features including at least downbeat confidence and position in the bar, as described in greater detail with respect to FIG. 11. In some embodiments, the acoustic feature groups also include a vocal activation feature. Therefore, for a temporal section comprised of five beats as described in conjunction with operation 206 above, the acoustic feature groups of the first beat are extracted, the acoustic feature groups of the second beat are extracted, and so on for the remaining third, fourth, and fifth beats.

In some embodiments, the temporal sections from which the acoustic feature groups are extracted are based on whether the cuepoint is a start cuepoint or an end cuepoint for the media content item. If the cuepoint is a start cuepoint, acoustic feature groups are extracted from temporal sections comprising a first N beats. For example, if the media content item has 550 beats, acoustic feature groups are extracted from temporal sections comprising the first 80 beats. If the cuepoint is an end cuepoint, acoustic feature groups are extracted from temporal sections comprising a last N beats. For example, if the media content item has 550 beats, acoustic feature groups are extracted from temporal sections comprising beats 80 to 550. In other embodiments, the acoustic feature groups can be extracted for every beat of the media content item. In such examples, the acoustic feature groups can be extracted prior to the partitioning of the beats into the temporal sections.

Figure 13:
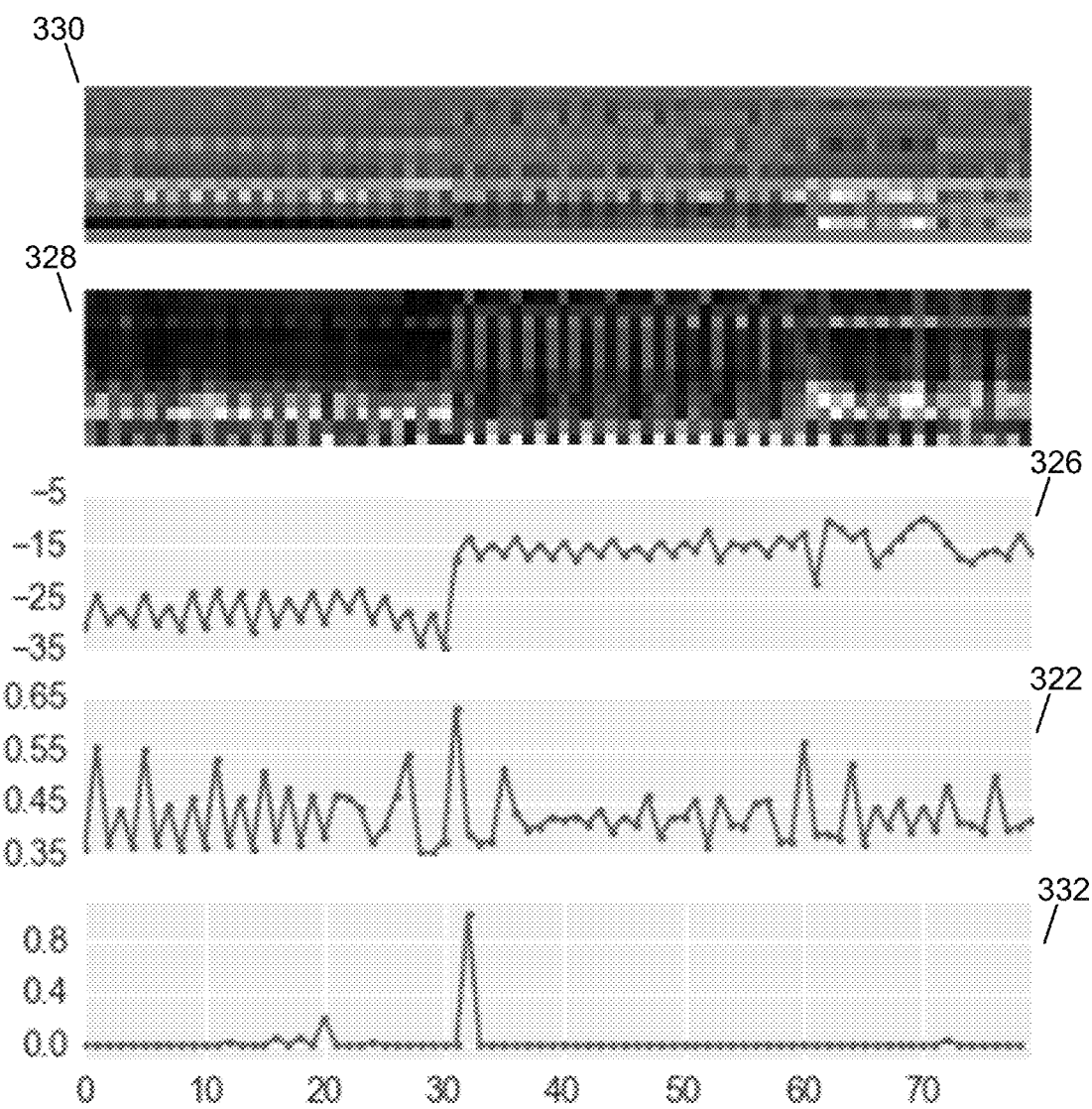
FIG. 13 is an example graphical representation of acoustic feature groups and CNN output.

At operation 210, for the one or more of the temporal sections, the extracted acoustic feature groups are provided as input to the CNN 114 to predict candidate cuepoint placements. In some embodiments, the CNN provides as output a probability ranging from 0 to 1 that a beat immediately following each of the temporal sections is a candidate for placement of the cuepoint. In other words, the prediction indicates whether a given beat is a good placement for the cuepoint or not based on the acoustic features of the immediately preceding beats (e.g., based on changes in pitch, timbre, and loudness leading up to the given beat). A graphical representation of the output is illustrated in FIG. 13.

At operation 212, a cuepoint placement in the media content item is determined from among the candidate cuepoint placements that are received as output from the CNN 114. For example, the cuepoint placement can be determined as the beat immediately following a temporal section having a highest probability (e.g., closest to 1).

At operation 214, the cuepoint is automatically placed in the media content item based on the determination. For example, the cuepoint is placed at the beat immediately following the temporal section having the highest probability. In some embodiments, the cuepoint determination engine 112 provides the determined cuepoint placement to the media content transition engine 110 of media-playback engine 108, where the media content transition engine 110 places or labels the cuepoint in the media content item accordingly. In other embodiments, the cuepoint is automatically placed or labeled in the media content item before the media content item is provided to the media-playback engine 108.

Figure 4:
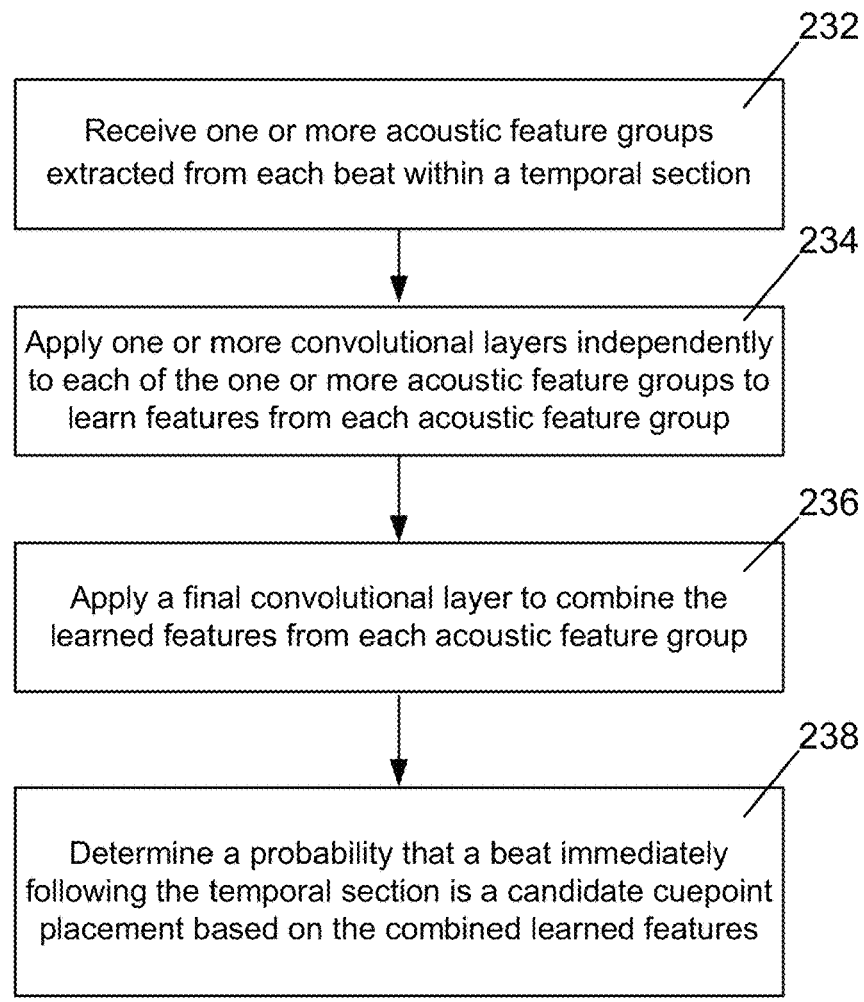
FIG. 4 illustrates an example method for predicting candidate cuepoint placements.

FIG. 4 illustrates an example method 230 for predicting a candidate cuepoint placement. In this example, the method 230 is described as being performed by the CNN 114 as described in FIG. 1 and FIG. 2.

Method 230 may begin at operation 232, where one or more acoustic feature groups extracted from each beat within a temporal section are received at the CNN 114. The acoustic feature groups include at least downbeat confidence, position in bar, peak loudness, timbre, and pitch. In some examples, the acoustic feature groups also include vocal activation. Each acoustic feature group represents a set of weights.

At operation 234, one or more convolutional layers are applied independently to each of the acoustic feature groups to learn features from each acoustic feature group. For example, a first set of convolutional layers is applied to the downbeat confidences extracted from the beats within the temporal section. A second set of convolutional layers is applied to the positions in bar extracted from the beats within the temporal section. A third set of convolutional layers is applied to the peak loudness extracted from the beats within the temporal section. A fourth set of convolutional layers is applied to the timbre extracted from the beats within the temporal section. A fifth set of convolutional layers is applied to pitch extracted from the beats within the temporal section. The learned features can include how the each of the acoustic feature groups change over the temporal section, such as whether certain features are building or waning.

At operation 236, a final convolutional layer is applied to combine learned features for each of the feature groups from operation 234. In some embodiments, the final convolutional layer includes a dense layer followed by a sigmoid activation to perform a logistic regression, for example. Additional details regarding application of the sets of convolutional layers and final convolutional layer are described below with respect to FIG. 12.

At operation 238, a probability that a beat immediately following the temporal section is a candidate cuepoint placement is determined based on the combined learned features. For example, the determination is based on the logistic regression performed. The probability is provided as output of the CNN 114. The probability is in a range from 0 to 1, where 0 indicates the given beat is not a valid candidate cuepoint placement and 1 indicates the given beat is a valid and strong candidate cuepoint placement.

Method 230 can be repeated for each temporal section from which extracted acoustic features groups are received. Accordingly, a plurality of probabilities can be provided as output from the CNN 114 and compared in order to determine a placement for the cuepoint. For example, a beat immediately following the temporal section having the highest probability (e.g., closest to 1) is determined for placement of the cuepoint.

Figure 5:
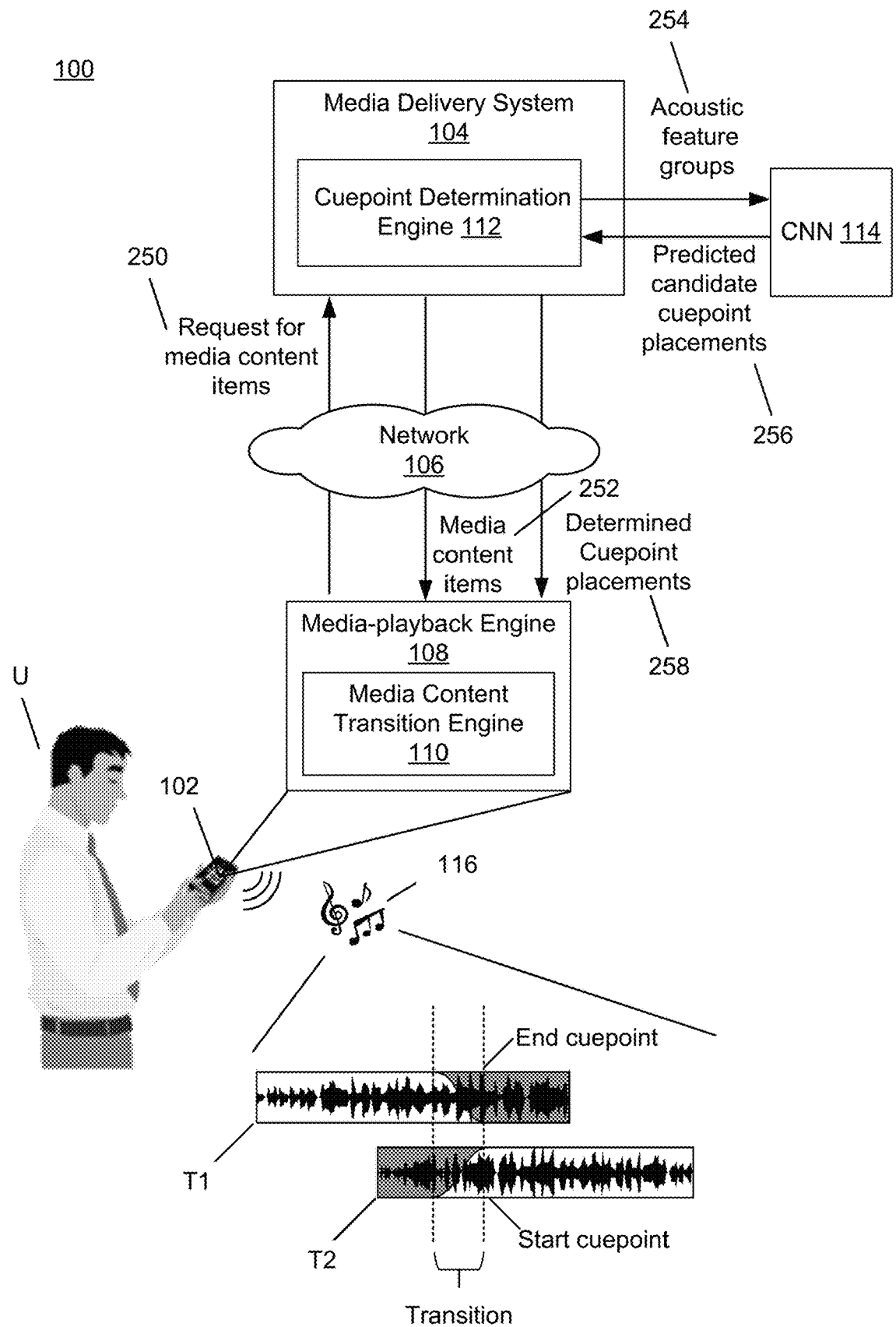
FIG. 5 is a process flow diagram for an example cuepoint determination system.

FIG. 5 is a process flow diagram for example cuepoint determination system 100. As described in greater detail with respect to FIG. 1, the system 100 includes the media playback device 102 comprising a media-playback engine 108 and media content transition engine 110, and the media delivery system 104 comprising a cuepoint determination engine 112 communicatively coupled to the CNN 114. The system 100 communicates across a network 106.

User U uses the media playback device 102 to request and continuously play back a plurality of media content items. For example, the user U provides a request 250 to stream media content items. In one example scenario, the request 250 is for media content items including the first media content item T1 and the second media content item T2. Media playback device 102 sends the request 250 over network 106 to the media delivery system 104. Media delivery system 104 provides the media content items 252 to the media playback device 102 independently or simultaneously over the network 106.

However, user U may not want to have to play each media content item from start-to-finish before proceeding to the next song. Rather, like many other users today, user U would prefer a smooth transition from one media content item from another (e.g., a smooth transition between first media content item T1 and second media content item T2). Therefore, in addition to providing the media content items in response to the request 250, media delivery system 104 is operative to determine cuepoints for each of the media content items to facilitate transitions between the media content items.

The cuepoints determined for each media content item include a start cuepoint and an end cuepoint. Within transitions, the start cuepoint serves as a fade in point for a media content item and the end cuepoint serves as a fade out point for the media content item. For example, to transition between the first media content item T1 and the second media content item T2, an end cuepoint of the first media content item T2 and the start cuepoint of the second media content item T2 define the transition (e.g., trigger an end of the transition as illustrated).

Additionally, the user U may prefer to listen to the media content items in a random or shuffled order, rather than according to a set playlist. Thus, it is not known by the media delivery system 104 which two media content items will be played successively by the media-playback engine 108. Accordingly, both start and end cuepoints are determined for each media content item independently from other media content items such that it does not matter an order in which the media content items are played.

For example, in response to receiving the request 250, the cuepoint determination engine 112 operates in conjunction with the CNN 114 to determine cuepoint placements within the media content items. For each of the media content items, the cuepoint determination engine 112 receives the audio content of the requested media content item in a raw audio format (e.g., from the media data store 162). The audio content is normalized from the raw audio format to a plurality of beats. Additionally, the beats are partitioned into temporal sections. The normalization and partitioning allows the CNN 114 to more easily consume and process inputs. For example, the inputs are provided on a per temporal section basis, where the inputs include acoustic feature groups 254 for each beat within a temporal section extracted by the cuepoint determination engine 112. The acoustic feature groups include at least downbeat confidence, position in bar, peak loudness, timbre, and pitch.

The CNN 114 provides as output a prediction that a beat immediately following the temporal section is a candidate cuepoint placement. For example, the prediction is a probability that a beat immediately following the temporal section is a candidate for cuepoint placement. This can be repeated for one or more of the temporal sections of the media content item yielding predicted candidate cuepoint placements 256. The predicted candidate cuepoint placements 256 are provided to the cuepoint determination engine 112. The cuepoint determination engine 112 then determines the cuepoint placement from among the candidate cuepoint placements 256. In some embodiments, the determination is made based on the temporal section that has a highest probability. The determined cuepoint placement can be for a start cuepoint, for example. The above process is repeated so that a cuepoint placement for an end cuepoint can also be determined (e.g., collectively determined cuepoint placements 258).

In some embodiments, the determined cuepoint placements 258 are transmitted over the network 106 from the media delivery system 104 to the media playback device 102 separate from the respective media content items 252, as illustrated. The media content transition engine 110, which operates to create transitions between the media content items that are played sequentially by the media-playback engine 108, places the cuepoints in the respective media items according to the determined cuepoint placements 258. In other embodiments, the media delivery system 104 has already placed the cuepoints in the respective media content items prior to providing the media content items 252 to the media playback device 102.

Figure 6:
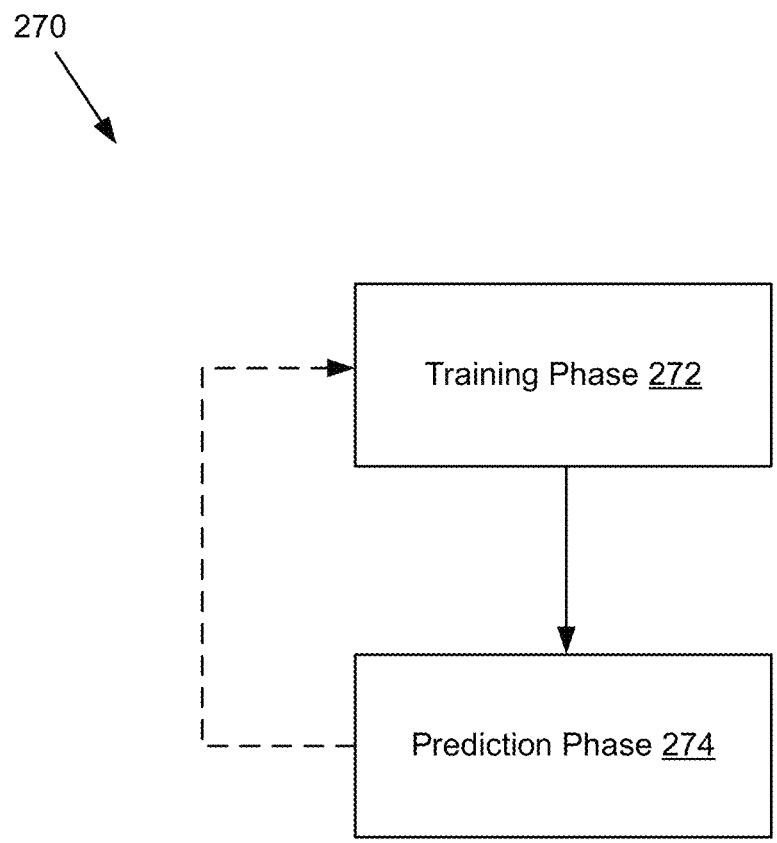
FIG. 6 is a conceptual diagram illustrating example phases of the CNN.

FIG. 6 is a conceptual diagram 270 illustrating example phases of the CNN 114. The example phases include a training phase 272 described in detail with respect to FIG. 7, and a prediction phase 274 described in detail with respect to FIG. 8. For example, CNN 114 may first be trained during the training phase 272 using human-labeled cuepoints, and once sufficiently trained may then be used to predict cuepoints in media content items that have not been previously labeled during the prediction phase 274. In some embodiments, feedback based on the predictions output by the CNN 114 during the prediction phase may be used to further train the CNN 114 to facilitate learning.

Figure 7:
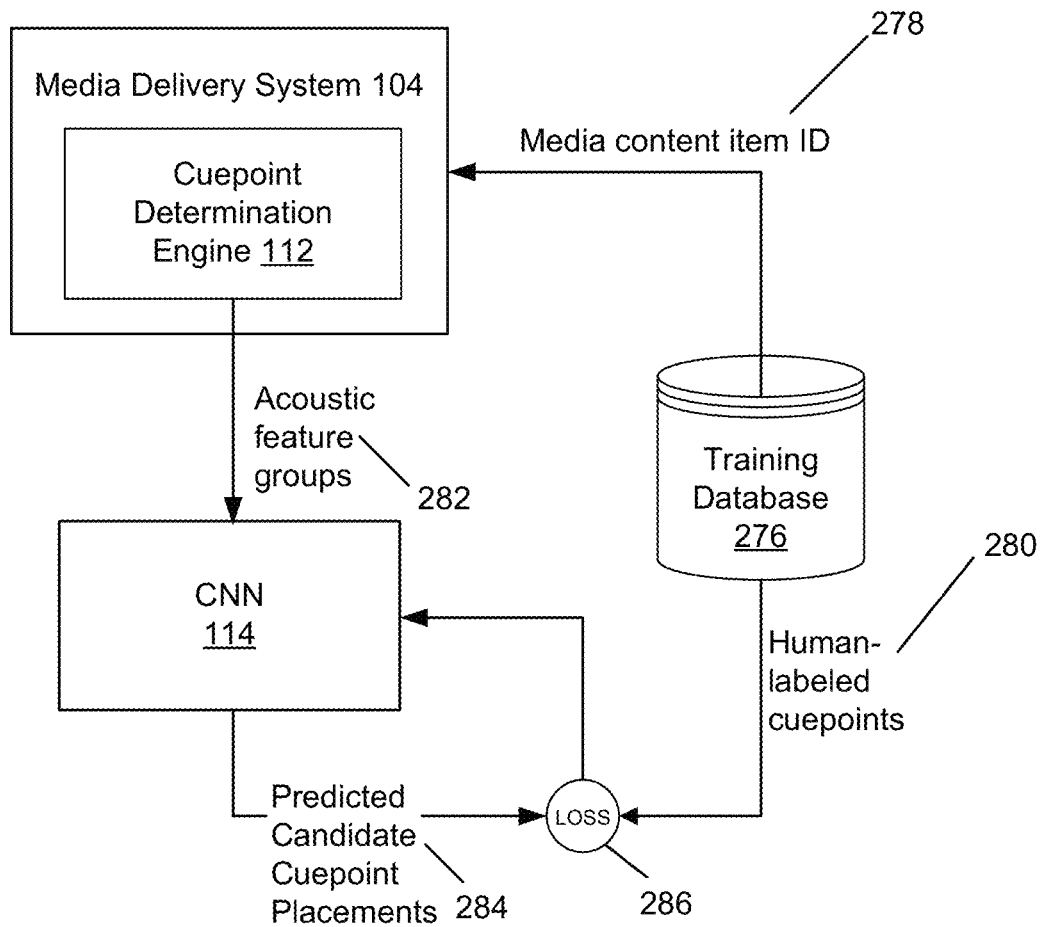
FIG. 7 is a process flow diagram for an example training phase of the CNN.

FIG. 7 is illustrates an example training phase 272 of the CNN 114. During the training phase 272, the CNN 114 is trained with training data from a training database 276. The training data includes thousands of media contents items having cuepoints previously labeled by humans. The training data can be in a particular format comprising an identifier of a media content item (e.g., media content item ID 278), as well a millisecond time stamp for a start endpoint of the media content item and a millisecond time stamp for the end cuepoint of the media content item (e.g., human-labeled cuepoints 280).

To train the CNN 114, the media content item ID 278 is retrieved from training database 276 and provided to the media delivery system 104. The media delivery system 104 uses the media content item ID 278 to identify an associated media content item (e.g., from media data store 162). Audio content of the associated media content item is provided to the cuepoint determination engine 112, and the cuepoint determination engine 112 can normalize the audio content to beats, partition the beats into temporal sections, and for each beat of one or more of the temporal sections, extract acoustic feature groups 282 for provision as input to the CNN 114.

The acoustic feature groups 282 are provided as input on a per temporal section basis. For example, the acoustic feature groups 282 extracted for each beat within a temporal section are provided to the CNN 114. In some embodiments, the input is in a form of a feature matrix, described in detail with respect to FIG. 11 below. The CNN 114 applies one or more convolutional layers independently to each acoustic feature group to learn features of each group, and applies a final convolutional layer to combine learned features for each of the groups. Based on the combined learned features, a prediction (e.g., a probability) that a beat immediately following the temporal section is a candidate cuepoint placement is provided as output of the CNN 114. This can be repeated for one or more additional temporal sections such that one or more predicted candidate cuepoint placements 284 are provided as output.

Because the media content item has been previously labeled (e.g., the human-labeled cuepoints 280 are known), a loss function 286 can be performed using the predicted candidate cuepoint placements 284 and the known human-labeled cuepoints 280 to determine discrepancies or errors. As one example, the loss function 286 is a binary cross entropy loss function. Results of the loss function 286 are fed back to the CNN 114 to facilitate learning and improve accuracy of future predictions, with a goal of minimizing the loss function 286 throughout the training phase 272.

In additional embodiments, the CNN 114 can be further optimized using the Adam optimizer. Example optimization techniques using the Adam optimizer are described in detail in Diederik P. Kingma and Jimmy Ba, *Adam: A method for stochastic optimization*, arXiv preprint arXiv:1412.6980, 2014.

The CNN 114 remains in the training phase 272 until a particular threshold of accuracy is met. As one illustrative example, the training database 276 stores 4,000 media content items having previously labeled cuepoints. An initial training data set includes 3,000 of the media content items, where the remaining 1,000 are set aside as one or more validation sets to determine an accuracy of the CNN 114. If the validation sets confirm the accuracy satisfies the particular threshold, the training phase 272 ends, and the prediction phase 274 begins. In some embodiments, in order to prevent overfitting and reduce computation time, an early stopping heuristic requiring a positive change in the validation accuracy within ten epochs is introduced.

Figure 8:
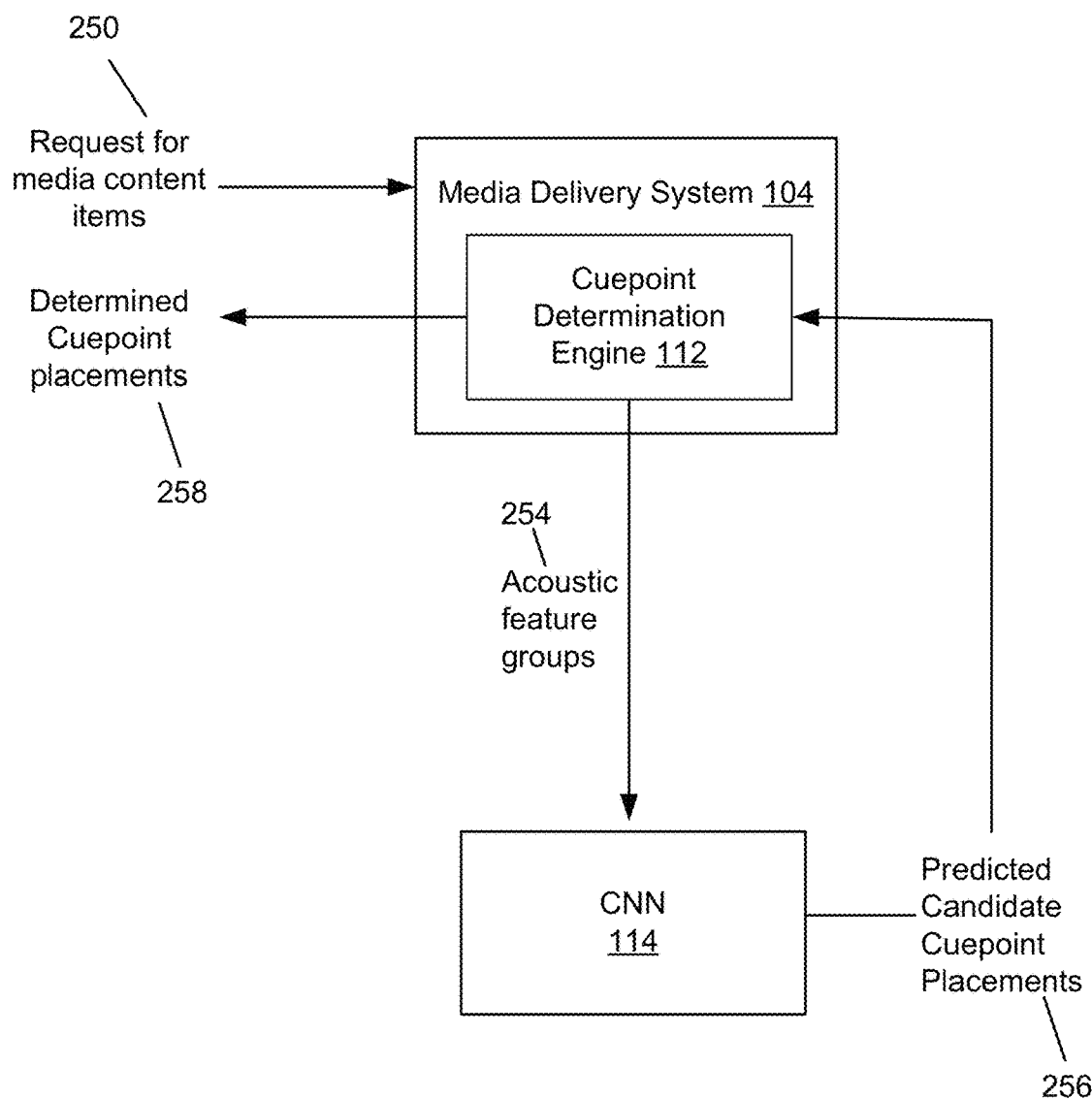
FIG. 8 is a process flow diagram for an example prediction phase of the CNN.

FIG. 8 illustrates an example prediction phase 274 of the CNN 114. During the prediction phase 274, the CNN 114 receives inputs associated with media content items that have not had cuepoints previously labeled. For example, referencing back to FIG. 6, upon receipt of the request 250 from user U for media content items 252 at media delivery system 104, cuepoint determination engine 112 can receive audio content for each media content item, normalize the audio content to beats, partition the beats into temporal sections, and for each beat of one or more of the temporal sections, extract the acoustic feature groups 254 for provision as input to the CNN 114.

On a per temporal section basis for each media content item, the CNN 114 applies one or more convolutional layers independently to each acoustic feature group to learn features of each group, and applies the final convolutional layer to combine learned features for each of the groups. Based on the combined learned features, a prediction (e.g., a probability) that a beat immediately following the temporal section is a candidate cuepoint placement is provided as output of the CNN 114 (e.g., a candidate cuepoint placement). This can be repeated for each of one or more temporal sections of the media content item, yielding candidate cuepoint placements 256. The candidate cuepoint placements 256 are then provided to the cuepoint determination engine 112. The cuepoint determination engine 112 determines cuepoint placements (e.g., the determined cuepoint placements 258) from among the candidate cuepoint placements 256. The determined cuepoint placements 258 can include both a start cuepoint and an end cuepoint for each media content item.

Figure 9:
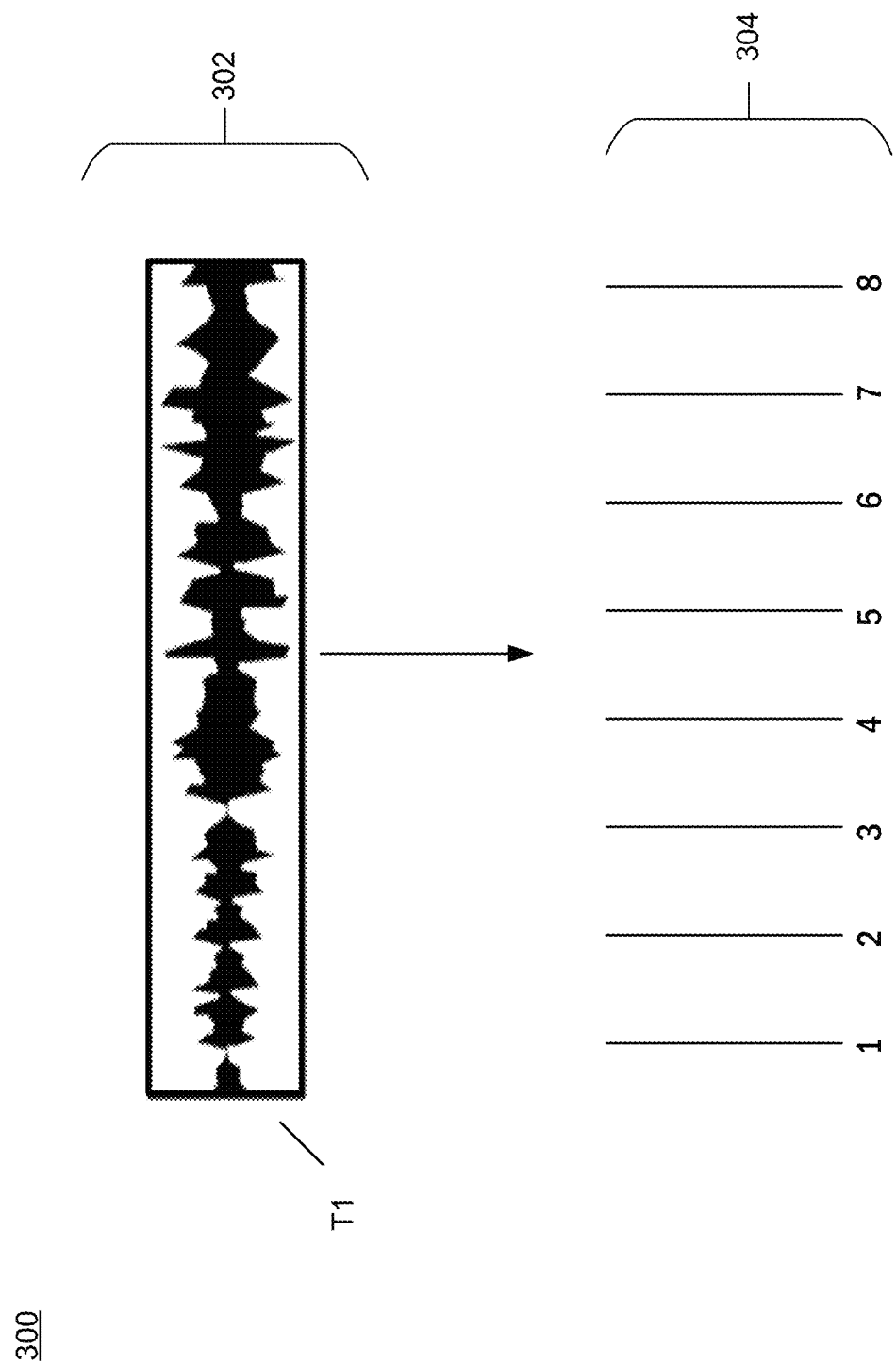
FIG. 9 is a conceptual diagram illustrating normalization of audio content in a raw audio format to a plurality of beats.

FIG. 9 is a conceptual diagram 300 illustrating audio content normalization. For example, conceptual diagram 300 depicts operation 204 of method 200 performed by cuepoint determination engine 112, as described in FIG. 2.

The cuepoint determination engine 112 receives at least a portion of audio content 302 of a media content item, such as first media content item T1, from the media data store 162. The audio content 302 received is in a raw audio format. In this file format, the audio content 302 is uncompressed and does not include any header information making the file large and cumbersome to process. Therefore, the received audio content 302 is normalized into a plurality of beats 304. For example, milliseconds of the audio content 302 are normalized to beats 304. For illustrative simplicity, eight beats are depicted. However, a media content item often contains hundreds of beats. Beat detection may be performed to normalize the audio content 302 to the beats 304. Methods for beat detection are generally described in S. Durand, E. J. Humphrey, and T. Jehan. *Teacher-student training for learning on small, biased datasets*, In Proceedings of the International Conference on Machine Learning (ICML).

Figure 10:
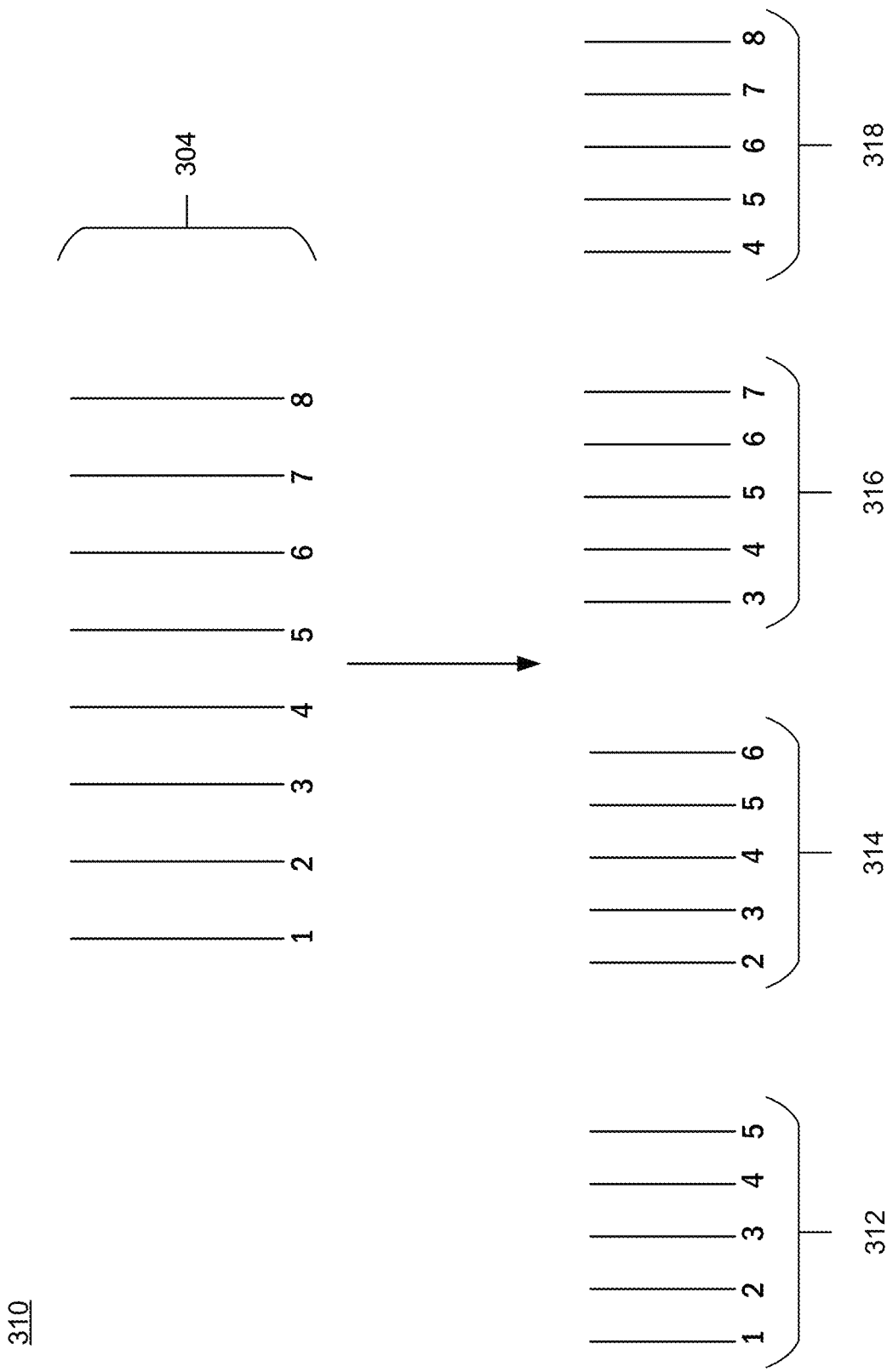
FIG. 10 is a conceptual diagram illustrating partitioning of a plurality of beats into temporal sections.

FIG. 10 is a conceptual diagram 310 illustrating partitioning of the plurality of beats 304 into one or more temporal sections (e.g., sections 312, 314, 316, and 318). For example, conceptual diagram 310 depicts operation 206 of method 200 performed by cuepoint determination engine 112, as described in FIG. 2.

The temporal sections are windows of a length W, where W=N beats. As one example embodiment, a window length of W=5 beats can be selected to capture one previous measure (e.g., when in 4/4 time), plus the current beat. In other embodiments, other window lengths are selected. For example, the window length can be dependent on a time in which the media content item is written.

Additionally, the temporal sections can be sliding windows. To provide a simplified example, the beats 304 comprise eight beats. When the beats 304 are partitioned into windows of W=5 beats, a first temporal section 312 includes beats 1, 2, 3, 4, and 5. The window may then "slide" by one beat such that a second temporal section 314 includes beats 2, 3, 4, 5, and 6, a third temporal section 316 includes beats 3, 4, 5, 6, and 7, and a fourth temporal section 318 includes beats 4, 5, 6, 7, and 8.

Figure 11:
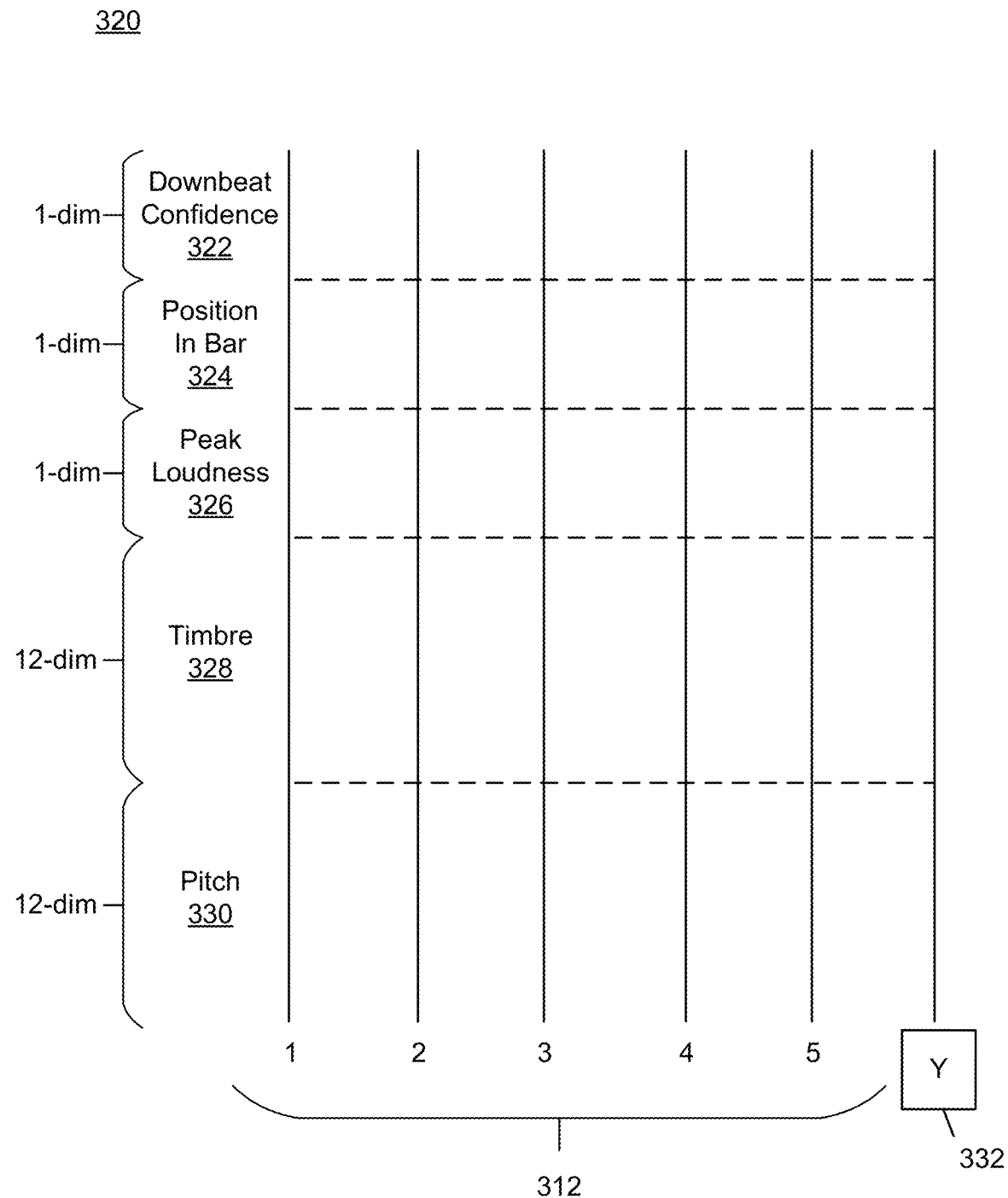
FIG. 11 is a conceptual diagram illustrating acoustic feature group extraction from beats in a temporal section for provision as input to a CNN.

FIG. 11 is a conceptual diagram 320 illustrating acoustic feature group extraction from beats in a temporal section, such as the first temporal section 312, for provision as input to a CNN 114. For example, conceptual diagram 320 depicts operations 208 and 210 of method 200 performed by cuepoint determination engine 112, as described in FIG. 2.

For each beat 1, 2, 3, 4, and 5 in the first temporal section 312, one or more feature groups are extracted. As illustrated, the feature groups extracted include downbeat confidence 322, position in bar 324, peak loudness 326, timbre 328, and pitch 330. In some embodiments, values corresponding to the extracted feature groups can be provided in a two-dimensional feature matrix as input to the CNN 114.

The downbeat confidence 322 is a one-dimensional feature group describing a confidence that each beat is a downbeat, and is comprised of a value in a range between 0 and 1. For example, the value is 0 if the given beat is not a downbeat, and the value is 1 if the given beat is confidently a downbeat. Downbeat confidence 322 is an important feature because transitions often occur on downbeats. To determine the downbeat confidence 322, beat positions in the media content item are first estimated and represented in time as a vector b. Based on the beat positions, downbeat positions can be estimated. The downbeat positions are positions of beats that are accented beats. In some embodiments, a downbeat can be a first beat of a bar. The downbeat confidence 322 for a given beat can be determined based on the estimated downbeat positions. The downbeat confidence 322 can be represented as a (1×N) matrix, where N is the number of beats in the temporal section (e.g. (1×5) matrix in the first temporal section 312) and the matrix describes a confidence that each beat is a downbeat. An example graphical representation of the downbeat confidence 322 is illustrated in FIG. 13.

The positon in bar 324 is a one-dimensional feature group describing a position of each beat in a bar measure, and is comprised of a value of 1, 2, 3, or 4. For example, there are four positions in the bar measure. A value of 1 corresponds to a given beat in the first position, a value of 2 corresponds to a given beat in the second position, a value of 3 corresponds to a given beat in the third position, and a value of 4 corresponds to a given beat in the fourth position. The position in bar 324 can be represented as a (1×N) matrix, where N is the number of beats in the temporal section and the matrix describes a position of each beat in the bar.

Example approaches of estimating the beats and downbeats to extract the downbeat confidence 322 and the position in bar 324 are generally described in S. Durand, E. J. Humphrey, and T. Jehan. *Teacher-student training for learning on small, biased datasets*, In Proceedings of the International Conference on Machine Learning (ICML).

The peak loudness 326 is a one-dimensional feature group representing a loudness of media content items at the particular beats. In general, transition regions with low loudness can often sound inappropriate and abrupt, and thus are not desirable for cuepoint placement. The peak loudness 326 can be represented as a (1×N) matrix, where N is the number of beats in the temporal section and the matrix describes a loudness of each beat. An example graphical representation of the peak loudness 326 is illustrated in FIG. 13.

The timbre 328 is a twelve-dimensional feature group that represents a character or a quality of a sound or voice as distinct from its pitch and intensity. For example, the timbre 328 is a perceived sound quality of a musical note, sound, or tone that distinguishes different types of sound production, such as choir voices, and musical instruments, such as string instruments, wind instruments, and percussion instruments. The timbre 328 can be represented as a (12×N) matrix, where N is the number of beats in the temporal section and the matrix describes a spectral shape of each beat. An example graphical representation of the timbre 328 is illustrated in FIG. 13.

The pitch 330 is a twelve-dimensional feature group. The pitch 330 is a representation in which an entire spectrum of the audio content is projected into 12 bins representing the 12 distinct semitones of a musical octave, where a value of 0 to 12 can be assigned based on how much of each semitone in the octave is present at the given beat. The pitch 330 can capture harmonic and melodic characteristics of music, while being robust to changes in timbre and instrumentation. The pitch 330 is represented as a (12×N) matrix (where N is the number of beats in the temporal section) giving the pitch class distribution for each beat. An example graphical representation of the pitch 330 is illustrated in FIG. 13.

In some embodiments, the peak loudness 326, timbre 328, and pitch 330 can be resampled to a beat-synchronous grid to match the computed beats and downbeats discussed in conjunction with the downbeat confidence 322 and position in bar 324. Example approaches of extracting at least the peak loudness 326, timbre 328, and pitch 330 feature groups are generally described in Tristan Jehan, *Creating Music by Listening*, Massachusetts Institute of Technology, September 2005.

In other embodiments, vocal activation is another feature group extracted. Vocal activation is a one-dimensional feature group representing a probability of the presence of vocals at each beat, and comprises a range of values from 0 to 1, where 0 indicates a lack of vocals at the given beat and 1 indicates a presence of vocals. The vocal activation is represented as a (1×N) matrix (where N is the number of beats in the temporal section) describing the probability of vocals for each beat.

Once the feature groups are extracted for each beat of the first temporal section 312 and a corresponding value for the feature groups are assigned to the feature matrix, the feature matrix is provided as input to the CNN 114. The CNN 114 may then provide as output 332 whether the beat immediately following the first temporal section 312 is a candidate for a cuepoint placement, as described in detail with respect to FIG. 12 below.

Figure 12:
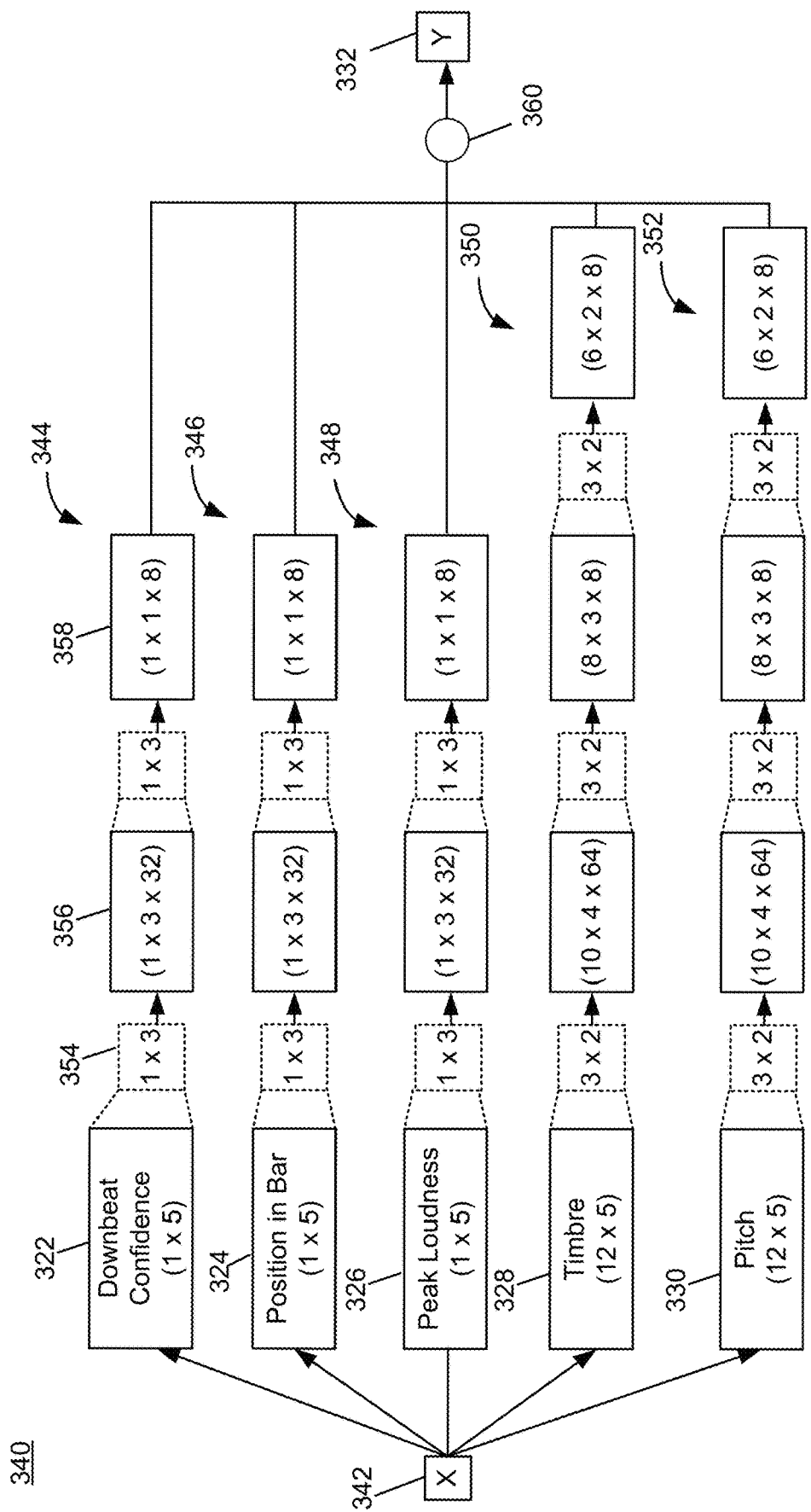
FIG. 12 is a schematic illustration of a CNN architecture.

FIG. 12 is a schematic illustration 340 of a CNN architecture. Input 342 to the CNN 114 is a feature matrix described in detail with respect to FIG. 11. The feature matrix is provided as input 342 on a per temporal section basis. For example, the feature matrix comprises values corresponding to extracted acoustic group features for each of the five beats of the first temporal section 312 (e.g., beats 1, 2, 3, 4, and 5). For the one-dimensional feature groups, including downbeat confidence 322, position in bar 324, and peak loudness 326, a (1×5) matrix is provided to the CNN 114 as input 342. For the twelve-dimensional feature groups, including timbre 328 and pitch 330, a (12×5) matrix is provided to the CNN 114 as input 342.

One or more convolutional layers are applied independently to each of the extracted acoustic feature groups to learn features of each acoustic groups. For example, a first set of layers 344 are applied for the downbeat confidence 322, a second set of layers 346 are applied for the position in bar 324, a third set of layers 348 are applied for the peak loudness 326, a fourth set of layers 350 are applied for the timbre 328, and a fifth set of layers 352 are applied for the pitch 330. A number of layers can vary for each set, and each layer applied can have a particular size filter 354. As illustrated, for the one-dimensional feature groups a (1×3) filter may be utilized and for the twelve-dimensional feature groups a (3×2) filter may be utilized. For example, for downbeat confidence 322, applying a (1×3) filter means that the downbeat confidence 322 of a first three beats are analyzed (e.g., beats 1, 2, 3), followed by the downbeat confidence 322 of a second three beats (e.g., beats 2, 3, 4), followed by the downbeat confidence 322 of a third three beats (e.g., beats 3, 4, 5).

After a convolutional layer is applied within each set of layers 344, 346, 348, 350 and 352, feature maps with a new shape (e.g., feature maps 356, 358 for the first set of layers 344 applied to the downbeat confidence 322) result as output. The output can then be used as input for a next layer. For example, the initial input provided for downbeat confidence 322 is a (1×5) matrix. A first convolutional layer of the first set of layers 344 is applied yielding a (1×3×32) matrix as the feature map 356, which is used as input to a second or intermediate convolutional layer within the first set of layers 344 to yield a (1×1×8) matrix as the feature map 358. Dimensions of the feature maps can be dependent on a size of the filer applied.

A final convolutional layer 360 is applied to combine learned features for each of the feature groups. For example, a final convolutional layer can be applied to the final feature maps generated for each of the feature groups (e.g., the feature map resulting from a last convolutional layer applied in a set of layers such as the feature map 358 for downbeat confidence 322). In some embodiments, the final convolutional layer 360 is a logistic regression yielding a value between 0 and 1.

After each layer within the sets of layers 344, 346, 348, 350 and 352 and after the final convolutional layer 360, a rectified linear unit activation function can be used. Additionally, batch normalization and dropout is performed after each layer. In some examples, the dropout rate is 25%.

The CNN 114 may then provide as output 332 a prediction or probability that the beat immediately following the first temporal section 312 is a candidate for a cuepoint placement based on the combined learned features. The output 332 can be the value between 0 to 1 yielded by the logistic regression, where 0 indicates the beat is not a valid candidate for a cuepoint placement and 1 indicates the beat is a valid and strong candidate for cuepoint placement.

The CNN 114 may provide the output 332 for one or more temporal sections of a media content item to the cuepoint determination engine 112. The cuepoint determination engine 112 can then determine the cuepoint placement from among the cuepoint placement candidates received as the output 332 from the CNN 114.

FIG. 13 is an example graphical representation of extracted feature groups, including downbeat confidence 322, peak loudness 326, timbre 328 and pitch 330, and CNN output 332. The output 332 is a prediction or probability in a range from 0 to 1 that a beat is a candidate for a cuepoint placement, where 0 indicates the beat is not a valid candidate for a cuepoint placement and 1 indicates the beat is a valid and strong candidate for cuepoint placement. As illustrated by the output 332, a valid candidate for cuepoint placement is beat 32, having a probability of almost 1. The only other beat with any value significantly above 0 is at beat 20, which only has a probability of about 0.25. Therefore, based on the output 332, the cuepoint determination engine 112 determines to place the cuepoint at beat 32.

As further illustrated by FIG. 13, beat 32 corresponds to a high value of downbeat confidence 322, a high value for peak loudness 326, as well as unique changes in timbre 328 and pitch 330. This helps to conceptually demonstrate how the CNN 114 is able to learn the impact of changes in these acoustic feature groups over a temporal section to more accurately predict whether a beat following the temporal section will be a good beat for cuepoint placement.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for placing a cuepoint in a media content item, the method comprising:
   receiving at least a portion of audio content of the media content item;
   normalizing the received audio content into a plurality of beats;
   partitioning the plurality of beats into temporal sections;
   selecting one or more temporal sections comprising a subset of the plurality of beats, the one or more temporal sections being selected based on whether a cuepoint placement corresponds to placement of:
      (i) a start cuepoint that serves as a fade in transition point for the media content item; or
      (ii) an end cuepoint that serves as a fade out transition point for the media content item;
   for each respective temporal section of the one or more selected temporal sections:
      extracting one or more acoustic feature groups for each beat of one or more beats within the respective temporal section; and
      providing the extracted acoustic feature groups for the one or more beats within the respective temporal section as input to a convolutional neural network (CNN) configured to predict whether the respective temporal section is indicative of a candidate cuepoint placement; and
   determining the cuepoint placement in the media content item from among one or more candidate cuepoint placements received as output from the CNN by:
      receiving as output from the CNN, for each respective temporal section of the one or more selected temporal sections, a probability that a beat immediately following the respective temporal section is the candidate cuepoint placement;
      comparing the received probability across the one or more of the temporal sections; and
      determining to place the cuepoint placement at the beat immediately following the temporal section having the highest probability based on the comparison.

2. The method of claim 1, further comprising:
automatically placing the cuepoint placement at the beat immediately following the temporal section having the highest probability based on the comparison.

3. The method of claim 1, wherein extracting the one or more acoustic feature groups for each beat within the temporal section comprises:
extracting one or more of downbeat confidence, position in bar, loudness, timbre, and pitch.

4. The method of claim 1, further comprising:
training the CNN with training data, the training data including media content items with previously labeled cuepoints.

5. The method of claim 4, wherein the training data includes a reference to an identifier of a respective media content item, a first millisecond time stamp for a start cuepoint of the respective media content item, and a second millisecond time stamp for an end cuepoint of the respective media content item.

6. The method of claim 1, wherein partitioning the plurality of beats into the temporal sections comprises:
partitioning the plurality of beats into sliding widow lengths comprised of N beats.

7. The method of claim 1, wherein if the cuepoint placement is the start cuepoint, further comprising:
selecting the one or more of the temporal sections to include temporal sections comprising a first N beats of the media content item.

8. The method of claim 1, wherein if the cuepoint placement is the end cuepoint, further comprising:
selecting the one or more of the temporal sections to include temporal sections comprising a last N beats of the media content item.

9. The method of claim 1, wherein normalizing the received audio content into the plurality of beats comprises:
receiving the at least the portion of the received audio content in a raw audio format; and
normalizing the raw audio format into the plurality of beats.

10. The method of claim 1, wherein
the probability that the beat immediately following the respective temporal section is the candidate cuepoint placement is based on the extracted acoustic feature groups for each beat of the one or more beats within the respective temporal section.

11. A system for placing a cuepoint in a media content item, the system comprising:
a convolutional neural network (CNN); and
a server communicatively coupled to the CNN, the server comprising at least one processing device and a memory coupled to the at least one processing device and storing instructions, that when executed by the at least one processing device, cause the at least one processing device to:
receive at least a portion of audio content of the media content item;
normalize the received audio content into a plurality of beats;
partition the plurality of beats into temporal sections;
select one or more temporal sections comprising a subset of the plurality of beats, the one or more temporal sections being selected based on whether a cuepoint placement corresponds to place of:
(i) a start cuepoint that serves as a fade in transition point for the media content item; or
(ii) an end cuepoint that serves as a fade out transition point for the media content item;
for each respective temporal section of the one or more selected temporal sections:
extract one or more acoustic feature groups for each beat of one or more beats within the respective temporal section; and
provide the extracted acoustic feature groups for the one or more beats within the respective temporal section as input to the CNN configured to predict whether the respective temporal section is indicative of a candidate cuepoint placement;
receive as output from the CNN, for each respective temporal section of the one or more selected temporal sections, a probability that a beat immediately following the respective temporal section is the candidate cuepoint placement;
compare the received probability across the one or more of the temporal sections; and
determine to place the cuepoint placement in the media content item, from among one or more candidate cuepoint placements received as output from the CNN, at the beat immediately following the temporal section having the highest probability based on the comparison.

12. The system of claim 11, wherein the CNN is configured to:
apply one or more convolutional layers to each of the extracted acoustic feature groups from a temporal section to learn features of each acoustic feature group;
apply a final convolutional layer to combine the learned features of each acoustic feature group,
wherein the probability that the beat immediately following the temporal section is the candidate cuepoint placement is based at least in part on the combined learned features.

13. The system of claim 12, wherein the CNN is configured to perform one or more of a rectified linear unit activation function, a batch normalization, and dropout after applying each convolution layer.

14. The system of claim 12, wherein the final convolutional layer is a dense layer followed by a sigmoid activation.

15. One or more non-transitory computer readable media comprising data instructions stored thereon that, when executed by one or more processing devices, cause the one or more processing devices to:
receive at least a portion of audio content of a media content item;
normalize the received audio content into a plurality of beats;
partition the plurality of beats into temporal sections;
select one or more temporal sections comprising a subset of the plurality of beats, the one or more temporal sections being selected based on whether a cuepoint placement corresponds to placement of:
(i) a start cuepoint that serves as a fade in transition point for the media content item; or
(ii) an end cuepoint that serves as a fade out transition point for the media content item;
for each respective temporal section of the one or more selected temporal sections:
extract one or more acoustic feature groups for each beat of one or more beats within the respective temporal section; and
provide the extracted acoustic feature groups for the one or more beats within the respective temporal section as input to a convolutional neural network (CNN) configured to predict whether the respective temporal section is indicative of a candidate cuepoint placement;

receive as output from the CNN, for each respective temporal section of the one or more selected temporal sections, a probability that a beat immediately following the respective temporal section is the candidate cuepoint placement;

compare the received probability across the one or more of the temporal sections; and determine to place the cuepoint placement in the media content item, from among one or more candidate cuepoint placements received as output from the CNN, at the beat immediately following the temporal section having the highest probability based on the comparison.

16. The one or more non-transitory computer readable media of claim 15, wherein when the cuepoint placement is the start cuepoint, the one or more temporal sections are selected from a first N beats of the media content item; and wherein when the cuepoint placement is the end cuepoint, the one or more temporal sections are selected from a last N beats of the media content item.

17. The one or more non-transitory computer readable media of claim 15, wherein the data instructions that normalize the received audio content into the plurality of beats further cause the one or more processing devices to:

receive the at least the portion of the received audio content in a raw audio format; and normalize the raw audio format into the plurality of beats.

18. The one or more non-transitory computer readable media of claim 15, wherein the probability that the beat immediately following the respective temporal section is the candidate cuepoint placement based on the extracted acoustic feature groups for each beat of the one or more beats within the respective temporal section.

* * * * *